US009502022B2

United States Patent
Chang et al.

(10) Patent No.: US 9,502,022 B2
(45) Date of Patent: Nov. 22, 2016

(54) APPARATUS AND METHOD OF GENERATING QUIET ZONE BY CANCELLATION-THROUGH-INJECTION TECHNIQUES

(75) Inventors: Donald C. D. Chang, Thousand Oaks, CA (US); Michael T. H. Lin, Chatsworth, CA (US); Steve Chen, Pacific Palisades, CA (US)

(73) Assignee: Spatial Digital Systems, Inc., Agoura Hills, CA (US)

( * ) Notice: Subject to any disclaimer, the term of this patent is extended or adjusted under 35 U.S.C. 154(b) by 968 days.

(21) Appl. No.: 12/874,437

(22) Filed: Sep. 2, 2010

(65) Prior Publication Data
US 2012/0058729 A1    Mar. 8, 2012

(51) Int. Cl.
*H04K 3/00* (2006.01)
*G10K 11/178* (2006.01)

(52) U.S. Cl.
CPC ......... *G10K 11/178* (2013.01); *G10K 2210/12* (2013.01); *G10K 2210/128* (2013.01); *G10K 2210/3215* (2013.01)

(58) Field of Classification Search
CPC ............... H04B 7/0613; H04B 7/0615; H04B 7/0617; H04K 1/00
USPC ........... 455/1, 63.1, 63.4, 66.1, 67.11, 67.16, 455/67.13, 126, 127.2, 82, 83, 552.1, 553.1, 455/501, 296, 114.2
See application file for complete search history.

(56) References Cited

U.S. PATENT DOCUMENTS

| 4,970,519 A * | 11/1990 | Minnis et al. ................. 342/165 |
| 5,355,417 A * | 10/1994 | Burdisso et al. ............ 381/71.7 |
| 6,404,398 B1 * | 6/2002 | Chen et al. ................... 343/754 |
| 6,480,139 B1 * | 11/2002 | Hoctor ............................ 342/13 |
| 6,844,850 B1 | 1/2005 | Lin |
| 7,155,179 B1 | 12/2006 | Rothenberg |
| 7,786,933 B2 | 8/2010 | Chang |

(Continued)

OTHER PUBLICATIONS

E. M. Poulter, M.J. Smith, J.A. McGregor; "S-band FMCW Radar Measuremeants of Ocean Surface Dyamics" J. Atmos. Oceanic Technology, 12, 1271-1286.

(Continued)

*Primary Examiner* — Tuan Pham

(57) ABSTRACT

A quiet zone generation technique is proposed for interference mitigation for a receive antenna by injecting the very interference signals via iterative processing, generating quiet zones dynamically for receive (RCV) antennas. The receive antenna may feature multiple receiving apertures distributed over a finite area. Optimization loops consist of four cascaded functional blocks; (1) a pick-up array to obtain the interference signals, (2) element weighting and/or repositioning processors, (3) an auxiliary transmit (XMIT) array with optimized element positions, (4) a diagnostic network with strategically located probes, and (5) an optimization processor with cost minimization algorithms. To minimize interferences between transmit (Tx) and receiving (Rx) apertures in limited space of an antenna farm for communications and/or radar applications are very tough problems. However, solutions for co-site interference mitigation may not be generic ones but more specific to geometries of antenna farms, Tx apertures and Rx antenna locations, and beam positions of the Tx beams.

22 Claims, 8 Drawing Sheets

(56) References Cited

U.S. PATENT DOCUMENTS

| | | | |
|---|---|---|---|
| 7,876,869 B1* | 1/2011 | Gupta | 375/350 |
| 2005/0009551 A1* | 1/2005 | Tsai et al. | 455/522 |
| 2005/0239406 A1* | 10/2005 | Shattil | 455/63.1 |
| 2006/0068719 A1* | 3/2006 | Hairapetian | 455/69 |
| 2007/0060058 A1* | 3/2007 | Shattil | 455/63.1 |
| 2007/0291866 A1* | 12/2007 | Rajappan | H04B 7/0413 375/267 |
| 2008/0026782 A1* | 1/2008 | Kwon et al. | 455/522 |
| 2008/0261509 A1* | 10/2008 | Sen | 455/1 |
| 2008/0291079 A1* | 11/2008 | Chang | 342/174 |
| 2009/0036082 A1* | 2/2009 | Sajid et al. | 455/296 |
| 2009/0117854 A1* | 5/2009 | Davis et al. | 455/69 |
| 2009/0176454 A1* | 7/2009 | Chen et al. | 455/63.1 |
| 2010/0022201 A1 | 1/2010 | Vandenameele | |
| 2011/0260920 A1* | 10/2011 | Dybdal et al. | 342/379 |

OTHER PUBLICATIONS

Weisun, M. Amin; "A Self-Coherence Based Anti-Jam Receiver" 2003 IEEE Workshop on Statistical Signal Processing; Sep. 28, 2003; 62-65.

A. Abbott; "Anti-Jamming and GPS for Critical Military Applications".

M. Mukhopadhyay, B. K. Sarkar, A. Chakraborty; "Augmentation of Anti-Jam GPS System Using Smart Antenna With a Simple Doa Estimation Algorithm" Progress in Electromagnetics Research, PIER 67, 231-249, 2007.

* cited by examiner

APPARATUS AND METHOD OF GENERATING QUIET ZONE BY CANCELLATION-THROUGH-INJECTION TECHNIQUES

RELATED APPLICATION DATA

BACKGROUND OF THE INVENTION

1. Field of the Invention

The present invention relates to architectures and designs of mitigation techniques for RF (radio frequency) systems against strong RF interferences.

Strong leakage signals from nearby transmitters often saturate receiver front-ends of RF systems. The invention relates to (1) mitigation architectures and designs of self-jamming in antenna farms where transmitting (Tx) and receiving (Rx) apertures are adjacent to one another over limited space; such as cell phone base-stations, RF repeaters, mobile communications terminals, FMCW (frequency modulated continuous-wave) radars, RF systems on air mobile platforms, RF systems on ships, RF systems on satellites, and etc.

On the other hand, strong external jamming signals often reduce sensitivity of RF receivers. This invention also relates to (2) mitigation architectures and designs of sensitive RF receivers against strong external jamming systems. In particular, this invention will enable airborne GPS (global positioning system) receivers to function properly, circumventing potential front end saturations due to strong external jamming signals.

2. Description of Related Art

In the field of radio frequency engineering, interference is not hard to find. In fact, it is actually difficult to avoid. By definition, interference originates from a source external to a signal path and produces undesired artifacts in the signal. Deliberate use of an interfering signal to disrupt communications is frequently referred to as jamming. A radio frequency, or RF, is loosely defined as being in that portion of the electromagnetic spectrum above audio (about 20 kHz) but below infrared (about 30 THz).

Sources of RF interference fall into two broad categories: intentional and unintentional interference. The purpose of intentional radio jamming is to make reception of desired signals difficult or impossible. One method that jamming is accomplished is by transmitting a signal on the same frequency as that used for communications. Consequently, jamming signals could be used to block multiple frequencies as well. On the other hand, power jammers feature very strong signals to saturate front-ends (the transmitting side) of communications, radiometers, or radar receivers, producing high intermodulation (IM) noises over receiving bandwidths, thus blocking communications signals.

GPS (global positioning system) receivers are effective in extracting the navigational information signals transmitted from satellites due to a large processing gain with spread spectrum techniques. Nevertheless, performance will significantly degrade if any strong interference source coexists with the information signal. Typically, a jamming signal with a power level less than 40 dB with respect to the signal power level, i.e. jammer-to-signal ratio (JSR) of 40 dB, can be tolerated in a GPS receiver. In practice, the received GPS satellite signal is about −160 dBm on the ground, and is too weak to tolerate any existence of easily generated strong unintentional RF interference and intentional jammers. Consequently, a technique for powerful jammer suppression has gained much attention.

A communication system can be full duplex or half duplex. In a full duplex system communicating transceivers can receive and transmit signals simultaneously, through different frequency bands. This is known as frequency division. Most current cellular standards have adopted the use of full duplex communications. However, a full duplex receiver is susceptible to a problem called "self-interference". Typically, full duplex transceivers resolve the self-interference problem by suppressing signals in the transmit frequency band at the receiver input. Unintentional jamming may result from cohabitation of multiple RF functions in an instrument over a small volume and operating concurrently in nearby frequency spectra. Some examples include multifunction handheld devices with GPS [1], or devices with both Will and Bluetooth [2]. WiFi is the current embodiment of wireless internet, while Bluetooth is a branch of wireless technology aimed at short distance data transmission (i.e. between a wireless headset and a cellular phone). These unintentional jammers, referred to as electromagnetic interferences (EMI), are key concerns for their designs.

U.S. Pat. No. 7,155,179 [1] describes a full duplex transceiver having a method for immunizing itself against self-jamming. It uses a centre frequency of jamming signals to down-convert the desired signal. This system works for single antenna element systems and requires significant dynamic range up to the high pass filter.

US Patent application #20100022201 [2] describes a full duplex transceiver using MIMO (multiple input and multiple output) systems to avoid self-jamming.

For some advanced radars such as FMCW radars [3], it is desirable to co-locate separated Tx and Rx apertures allowing "full duplex" operation between Tx and Rx functions, thus improving the radar operational duty cycle. Mitigations of self-jamming effects due to the leakage from nearby Tx apertures are one of the current concerns in radar designs.

REFERENCES

1. U.S. Pat. No. 7,155,179; "a full duplex transceiver having a method for immunizing itself against self-jamming" Bret Rothenberg
2. US Patent application #20100022201; "Apparatus And Method For Reducing Self-Interference In A Radio System", by Patrick Vandenameele
3. Poulter, E. M., M. J. Smith, J. A. McGregor, 1995: S-Band FMCW Radar Measurements of Ocean Surface Dynamics. J. Atmos. Oceanic Technol., 12, 1271-1286.
4. "A Self Coherence Based Anti-jamming GPS Receiver," W Sun, M G Amin—IEEE Transactions on Signal Processing, 2005.
5. "Anti-jamming and GPS for Critical Military Applications," by Anthony Abbott, http://www.aero.org/publications/crosslink/summer2002/06.html.
6. "Augmentation Of Anti-Jam Gps System Using Smart Antenna With A Simple Doa Estimation Algorithm," by M. Mukhopadhyay, B. K. Sarkar, and A. Chakraborty on *Progress in Electromagnetics Research, PIER* 67, 231-249, 2007
7. U.S. Pat. No. 6,844,850, "Anti-jammer pre-processor," by Lin, Tsui-tsai (Zhubei, TW), Publication Date: Jan. 18, 2005.

SUMMARY OF THE INVENTION

Accordingly, an embodiment of the present invention provides mitigation techniques for RF systems against strong interferences either due to self-jamming or from external RF sources enabling desired Rx apertures to function properly under strong jamming conditions. More specifically, the present invention relates to architectures and designs of antenna systems aimed to reduce or eliminate interference due to jamming, either self-induced or from an external source, comprising an RF antenna, a beam forming network, and an optimization processor. The present invention further comprises a series of injection arrays being fed a series of signals from the optimization processor and beam forming network.

An embodiment of the present invention disclosing functions of the injection arrays with a feed back loop are to minimize undesired self-jamming signals iteratively by dynamically updating the amplitudes and phases weightings, or equivalents, of individual elements in the injection array. The weightings of all elements are the components of a vector referred as a "cancellation weighting vector" or a CWV. The inputs to the injection arrays are from pickup ports, placed adjacent to transmit apertures. The feed back loop to the injection arrays features many diagnostic probes, which are distributed in the quiet zones and will be used to measure the strengths of combined interference signals. An optimization processor in the feed back loop converts the measurements from each probe into performance indexes. These are called cost functions and must be positively definite. The summation of all the cost functions is referred to as the total cost of the current performance measure for the injection arrays. The to-be-updated weights in the next iteration for individual elements of the injection arrays are calculated based on the gradient of the performance measurements by optimization algorithms minimizing the total cost iteratively.

At a steady state after the iterative results converge, the resulting cost will be reduced significantly. Consequently, the self-jamming signals leaked from transmit apertures are minimized over a quiet zone within which the sensitive Rx apertures reside. Therefore the Rx front-ends will be well protected from "saturations" caused by the strong self-jamming. Thus, the Tx and Rx apertures can operate in full duplex capacity. When multiple Tx apertures operate concurrently, injection loops to individually "handle" independent jamming sources must be provided in the designs of quiet zones generation mechanisms.

Another embodiment of the present invention discloses functions of the injection arrays with a feed back loop for sensitive RF receivers. This is to minimize undesired signals from external sources iteratively by dynamically updating the amplitudes and phase weightings, or equivalents, of individual elements in the injection array. The sensitive RF receivers may be regular GPS receivers with at least one antenna element. The weightings of all elements in an injection array are the components of a vector referred as a "cancellation weighting vector" or a CWV. The inputs to the injection arrays are from another receiving antenna which only picks up jamming signals from very strong external sources. The feed back loop to the injection arrays features many diagnostic probes, which are distributed in the quiet zones and will be used to measure strengths of combined interference signals.

An optimization processor in the feed back loop converts the measurements from each probe into performance indexes; which are called cost functions and must be positively definite. The summation of the all cost functions is referred as the total cost of the current performance measure for the injection arrays. The to-be-updated weights for the next iteration of individual elements in the injection arrays are calculated based on the gradient of the performance measurements by optimization algorithms minimizing the total cost iteratively.

At an optimized state after the iterative results converge; significantly reduced cost will be the result. Consequently, the external jamming signals are minimized over a quiet zone within which the sensitive Rx apertures reside. Therefore the Rx front-ends will be well protected from "saturations" by the strong external jammers.

A third embodiment of the present invention discloses functions of the injection arrays with a feed back loop for handheld personnel devices with multi-functions capability. For example, devices such as $4^G$ cell phones are designed to minimize undesired self jamming signals iteratively by dynamically updating the amplitudes and phases weightings, or equivalents, of individual elements in the injection array. The leakage may be from a Bluetooth transmission to sensitive WiFi receivers operating in the same ISM (industrial, scientific, medical) frequency channels. The weightings of all elements in an injection array are the components of a vector referred as a "cancellation weighting vector" or a CWV. The inputs to the injection arrays are from a pick up antenna adjacent to Blue Tooth antennas which only pick up jamming BT signals. The feed back loop to the injection arrays features a few diagnostic probes over quiet zones for the WiFi Rx apertures and will be used to measure the strengths of combined interference signals. An optimization processor in the feed back loop converts the measurements from each of the probes into performance indexes; which are called cost functions and must be positively definite. The summation of the all cost functions is referred as the total cost of the current performance measure for the injection arrays. The to-be-updated weights in the next iteration for individual elements of the injection arrays are calculated based on the gradient of the performance measurements by an optimization algorithm minimizing the total cost iteratively. At an optimized state after the iterative results converge, the resulting cost will be reduced significantly. Consequently, the internal strong leakage signals are minimized over a quiet zone within which the sensitive WiFi Rx apertures are resided. Thus, the WiFi Rx front-ends will be well protected from "saturations" by the strong internal interferences.

A fourth embodiment of the present invention discloses functions of the injection arrays with a feedback loop to minimize undesired signal strengths over limited regions of quiet zones iteratively by dynamically updating the amplitudes and phases weightings, or equivalents, of individual elements in the injection array. The undesired signals may be incoming cell phone signals to be received by users in a conference room or a music hall. The weightings of all elements in an injection array are the components of a vector referred as a "cancellation weighting vector" or a CWV.

The inputs to the injection arrays are from a pick up antenna array with multiple beams pointed toward individual nearby basestations which only pickups undesired incoming cell-phone signals. The feed back loop to the injection arrays features a few diagnostic probes located very near cell phone users in the quiet zones. The probes will be used to measure the combined strengths of undesired incoming cell phone signals from cell towers and those from injection array elements.

An optimization processor in the feed back loop converts the measurements from individual probes into performance indexes; which are called cost functions and must be positively definite. The summation of all cost functions is referred to as the total cost of the current performance measure for the injection arrays. The to-be-updated weights in the next iteration for individual elements of the injection arrays are calculated based on the gradient of the performance measurements according to optimization algorithm. The optimization process minimizes the total cost iteratively. At a steady state after the iterative processing converges, the resulting cost will be reduced significantly. Consequently, the undesired incoming (cell phone) signals levels will be significantly minimized over the quiet zones. Thus, users (cell phone users in particular) in the quiet zone will not receive incoming signals with adequate RF signal levels to maintain physical links at all.

These techniques dynamically alter field distributions of undesired incoming signals in limited areas over which the targeted receive apertures are resided. They are very different from power jamming techniques aiming to "saturate" front-ends of targeted receivers.

DETAILED DESCRIPTION OF THE PREFERRED EMBODIMENT

Figure 1:
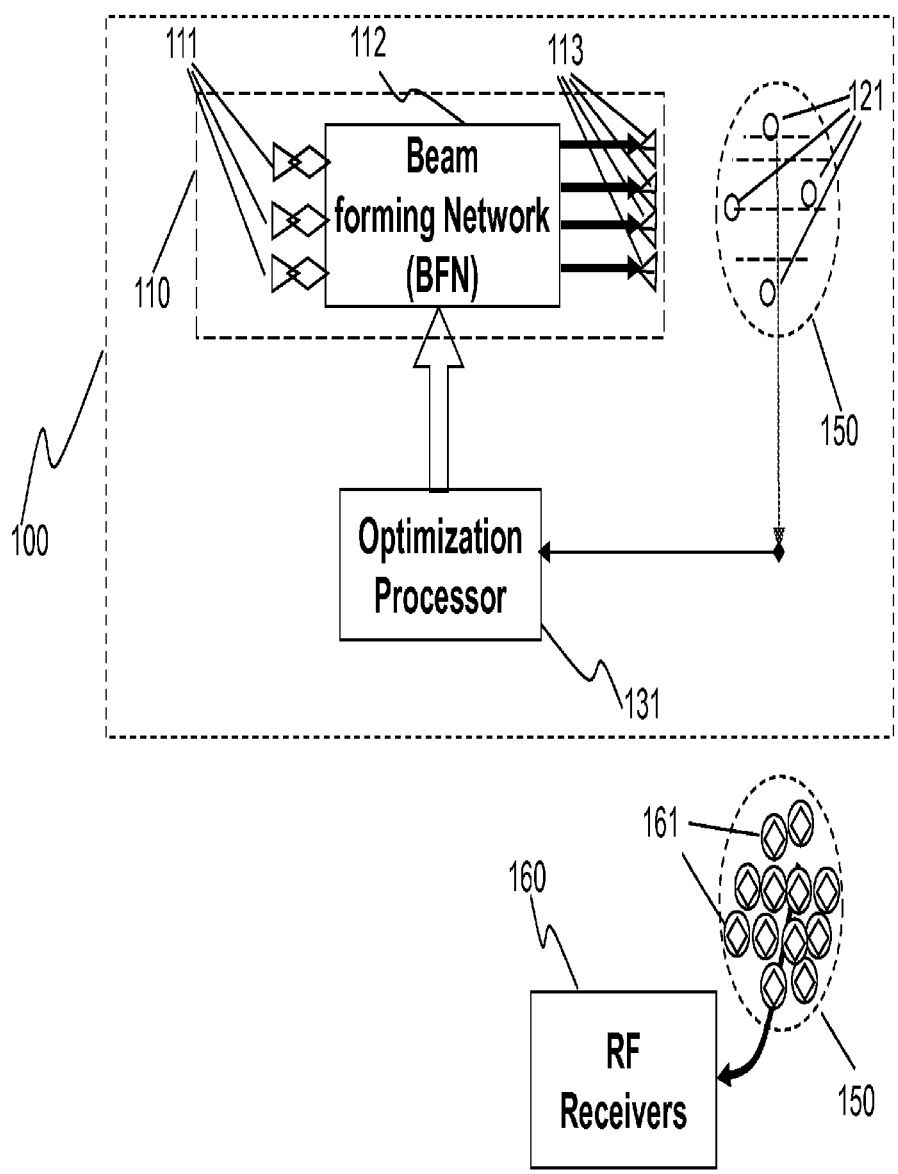
FIG. 1 illustrates a block diagram of architectures and methods of generating quiet zone via interference injection for cancellation over receiving apertures in a RF system according to an embodiment of the present invention. An auxiliary Tx array, a diagnostic network, and an optimization loop are depicted accordingly.

The proposed quiet zone generation technique features injection of interferences at low power levels for cancellations. The interference mitigation technique consists of an auxiliary injection array with iterative processing to dynamically maintain a quiet zone over limited areas over which Rx antenna apertures operating in full duplex while nearby Tx apertures with strong RF leakage are in operation.

In order to provide a working frame of reference, a glossary has been provided to define some terms used in the description and claims as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Next, an overview is presented to provide a general understanding of the scope and meaning of the terms used herein.

Glossary

Beam forming network—The term "beam forming network," as used herein, is a standard term used in the fields of electronics, telecommunications, radar design, and signal processing to denote a network that combines signals from multiple antennae into a pattern that is more directional than each antenna by itself because of array factors. The beam forming network may be of electronic or mechanical design. The aim of a beam forming network is to create a steerable radio frequency signal beam, thus boosting gain, directionality, and signal strength.

Beam weight vectors—The term "beam weight vectors," as used herein, is a term used in the field of electronics, telecommunications, radar design, and signal processing, to describe a process of altering a radio frequency signal by applying a certain value to the amplitude and phase, as well as giving identifiable qualities to the given signal. The beam weight vectors may be mechanical or electronic in design, and are aimed to provide information to a beam forming network for signal processing.

Cancellation beam weight vectors—The term "cancellation beam weight vectors," or cancellation weight vectors," or CWV as an acronym, as used herein, is a term used in the field of electronics, telecommunications, radar design, and signal processing, is an alternative form of the term "beam weight vectors." More specifically, the term is used to denote the sum of the vector values of amplitude and phase changes to minimize a given radio frequency signal. The aim is to provide electronic information to a beam forming network for signal processing.

Cancellation technique—The term "cancellation technique," or "cancellation techniques," as used herein, is a term used in the fields of electronics, telecommunications, and signal processing to denote a process of using a series of antenna apertures to inject some radio frequency signals into a quiet zone in order to reduce self-jamming and external jamming effects on radar receive apertures by nearby transmission apertures. The aim of this technique is to allow full duplex systems to operate to full capacity by reducing or eliminating unwanted interference.

Cost Function/Performance Index

Cost optimization—The term "cost Optimization," or "cost optimizing," as used herein, is a standard term used in the fields of electronics, mathematics, economics, signal processing, etc. to denote a process of finding the most cost-efficient element from a given set of alternatives.

Diagnostic probes—The term "diagnostic probe," as used herein, is a standard term used in the field of electronics, to denote an antenna aperture used to acquire radio frequency information such as phase, amplitude and field strength, then relay that information to a processing unit for diagnostic analysis. Specific to the present invention, the aim of the probes is to provide signal information so that the injected signals properly cancel out any unwanted interference.

Field-of-view—the term "field-of-view," or FoV as an acronym, as used herein, is a standard term in antenna design, to denote the maximum angle of transmission that a given antenna may broadcast a signal.

Jammer signal—The term "jammer signal," or "jamming signal," or "Jm," as used herein, is a standard term in electronics and telecommunications, to denote a source of radio frequency signals that produces undesired artifacts in a given radio frequency signal or signals, meaning the creation of interference, either externally propagated or self-created, and either intentional or unintentional. The aim of a jamming signal is to disrupt radio frequency transmissions when used in offensive manner.

Optimization processor—The term "optimization processor," as used herein, is used to denote a central processing unit, be it mechanical or electronic, that is used to perform the cost optimization process.

Pickup array—The term "pickup array," as used herein, is a term in the field of telecommunications, signal processing, and antenna design, is used to denote an antenna aperture used for the purpose of selecting and picking up undesired radio frequency jamming signals for processing. In the present invention, the aim of these pickup arrays is to identify and catalogue individual jamming signals so that the signal processor may cancel the jamming signal.

Quiet zone—The term "quiet zone," as used herein, is a standard term in the field of telecommunications, satellite antenna design and signal processing, to describe an area that is relatively free of radio frequency signals as well as unwanted radio frequency interference.

Rx array—the term "Rx array," or "reception array," or "receiving array," as used herein, is a standard term in the field of antenna design, to denote an antenna aperture that is used for the purpose of receiving incoming radio frequency signals and converts it into usable information for a user. The aim is to receive radio frequency signals that have either been actively transmitted to the desired receive array or passively transmitted.

RF leakage—The term "RF leakage," or "radio frequency leakage," as used herein, is a standard term in the field of telecommunications, electronics, and signal processing, to denote an issue where unwanted radio frequency signals are propagated in undesired directions as a result of use, and may possibly result in unwanted radio frequency interference in other receivers.

Self-interference—The term "self-interference," as used herein, is a standard term in the field of telecommunications, satellite antenna design, and signal processing, to describe phenomena in full duplex communication systems where the receive aperture of the system receives unwanted radio frequency interference from its own transmission aperture either due to frequency use overlap, or cohabitation of multiple radio frequency functions due to the close proximity of system instruments.

Tx array—The term "Tx array," or "transmission array," as used herein, is a standard term in the field of antenna design, to denote an antenna aperture that is used for the purpose of converting usable information into radio frequency signals, then broadcasts these outgoing radio frequency signals. The transmission array may be of dish design, or an array design.

Overview

FIG. 1 depicts the functional blocks of the injection for cancellation techniques 100. One such a design features the following functions; (1) an auxiliary Tx (injection) array 110, (2) diagnostic probes 121, and (3) optimization processing 131.

An auxiliary Tx array consists of an array of pickup sensors 111 to pick up M interferences in real time, (2) a beam forming network (BFN) 112 with a M-to-N distribution network, and (3) an array of N interference signal injectors 113. The M-to-N BFN 112 feature electronic amplitude and phase weighting, or equivalent, for each of its inputs and outputs. The weightings are referred as cancellation beam weight vectors (CWVs) or simply beam weight vectors (BWVs). The interference signal injectors 113 include signal conditioning and amplifications mechanisms as well as RF radiating elements, and may have optional re-positioning capability for some radiating elements. For example, M=1 and N=10.

The diagnostic probes 121 are mostly located inside the targeted quiet zones 150, over which Rx apertures 161 of beneficial RF receivers 160 are located.

The quiet zones 150 with limited areas are generated by dynamic injection of the interference signals through an auxiliary Tx array 110 with injection elements 113 distributed nearby Rx apertures 161 of beneficial receivers 160.

The pickup array 111 selects and picks up undesired jamming signals via its proximity to jamming sources or via its directional discriminations capability, picking-up strong jamming signals in far-field. The M picked-up jamming signals are fed to the BFN 112, in which each jamming signal is individually replicated into N-injection channels and then weighted separately with flexible CWV controlled by the optimization processor 131. In each of the N injection channels, there are M weighted replicated signals summed together as an injection channel signal for an individual interference injector 113. These signals are conditioned and amplified, and then radiated by the injection array 113 to reach the quiet zones 150. As results, the jammer field distributions in the quiet zones 150 are from the jamming sourced directly, and from the controlled radiations of the replicated jammer signals injected from the auxiliary array 110.

As a part of generating feedback signals, a network of diagnostic probes 121 is strategically distributed over the quiet zones. They function to continuously and dynamically measure the combined field distributions of the interfering signals. The optimization processor 131 converts measurements from individual probes to performance indexes, or "cost functions," to accordingly generate (a) a total cost by summing all the cost functions for each iteration and (b) cost gradients with respect to the BWV. Then it will calculate the new CWV for next updating in the BFN 112.

The iterative controls are through the generation of new CWV by an optimization processing using cost minimization algorithms based on the cost functions derived from currently measured data. The combined field distributions of the interfering signals comes from two sources; the direct jammers and the injected ones by the auxiliary array which features dynamic amplitude and phase weightings on all element individually.

The goal of the optimization process is to achieve "destructive interference" in the combined field distribution over the Rx aperture by dynamically controlling the amplitude and phase weightings in the auxiliary Tx array.

Real-time narrow-band controls of the auxiliary array radiations are through updating of amplitude and phase weighting, or in-phase/quadrature-phase (VQ) weighting, of the auxiliary array elements. We may modify the techniques using tap-delay-line processing structure for wideband processing if needed.

Figure 2:
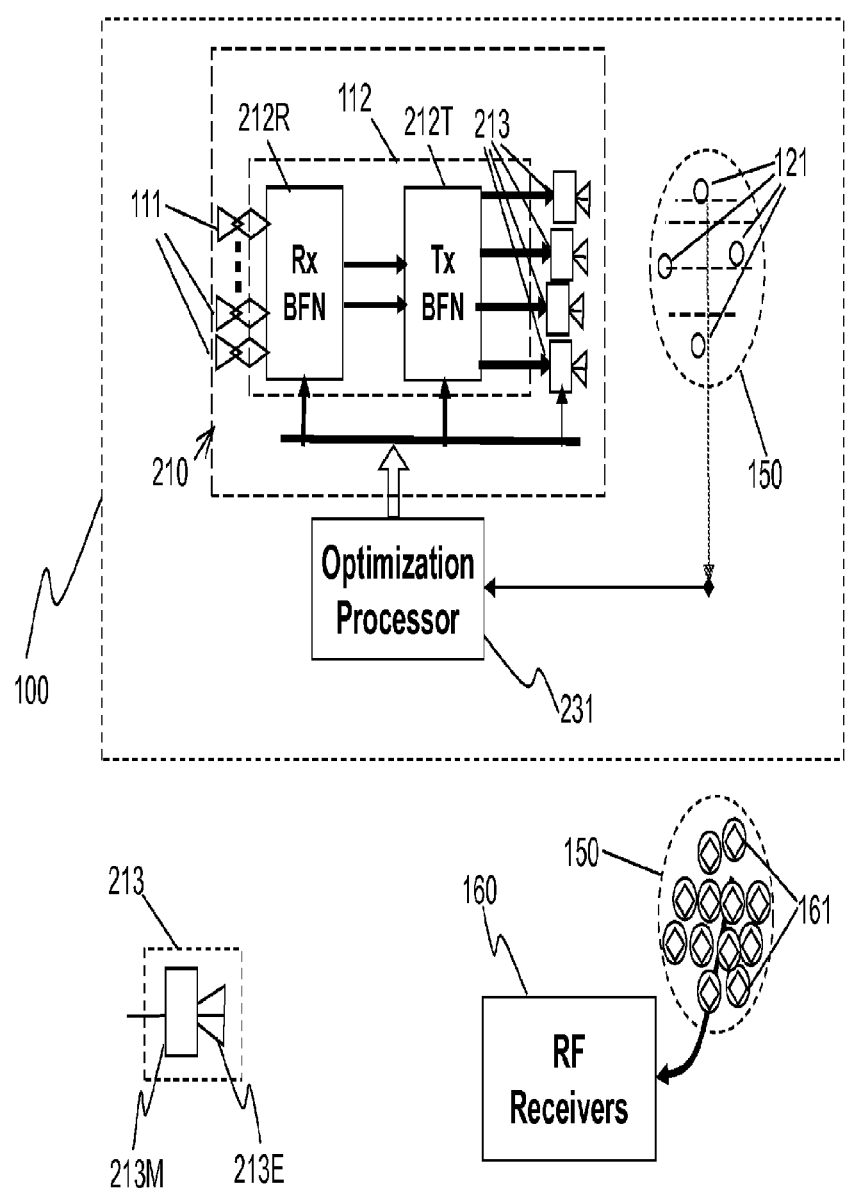
FIG. 2 illustrates an implementation of generating quiet zone via interference injection for cancellation over receiving apertures in a RF system according to an embodiment of the present invention. Element weight updating can be achieved via both the electronic amplitude and phase weighting or equivalent, and injection array elements re-positioning capability

FIG. 2 depicts one implementation method for the functional blocks of the injection for cancellation techniques 100 in FIG. 1. There are three major differences:
1. An implementation of the functions of BFN 112 illustrated in the block 210 consisting of functions of Rx BFN 212R and those of Tx BFN 212T.
2. The jammer radiation elements 213 illustrated with highlighted optional repositioning mechanisms 213M, and the remaining electronic functions 213E of signal conditioning and amplification functions.
3. The optimization processor 231 controlling the updating of the BWVs in Rx BFN, CWVs in Tx BFNs, and updating new positions of injection array elements.

Figure 3:
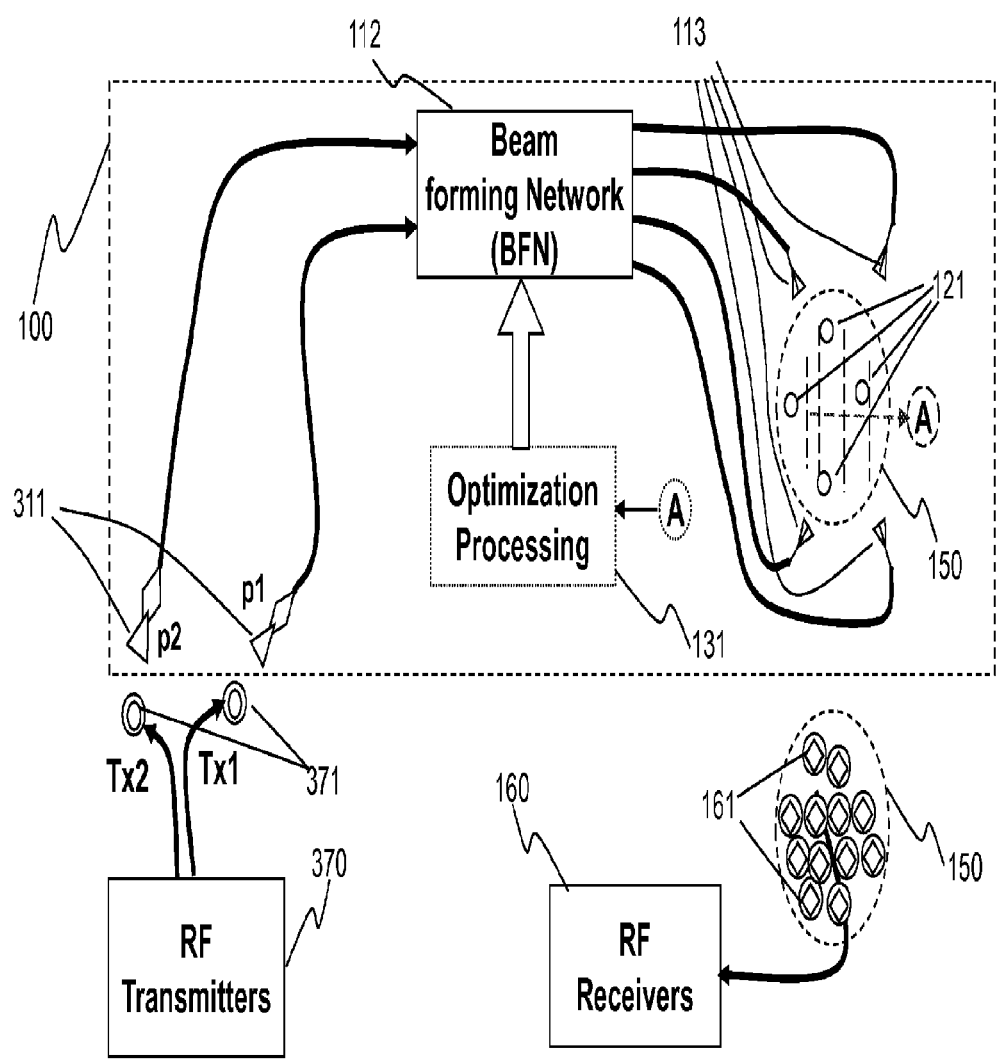
FIG. 3 illustrates a block diagram of an architecture and method of generating a quiet zone via injection of self-interference for cancellation over receiving apertures in a RF system according to an embodiment of the present invention. An auxiliary Tx array, a diagnostic network, and an optimization loop are depicted accordingly. The weight updating is electronic amplitude and phase weighting, or equivalent.

FIG. 3 depicts one implementation method for the functional blocks of the injection for cancellation techniques 100 against self-jamming in FIG. 1, with one major difference:
1. An implementation of pickup array 111 as two proximity elements 311 p1 and p2 to two Tx apertures 371, Tx1 and Tx2, of the RF transmitters 370. The interference signal injectors 113, i.e., injection elements, are distributed around the targeted quite zone 150; two of the injection elements 113 are distributed opposite to each other with respect to the targeted quite zone 150 and another two of the injection elements 113 are also distributed opposite to each other with respect to the targeted quite zone 150.

Figure 4:
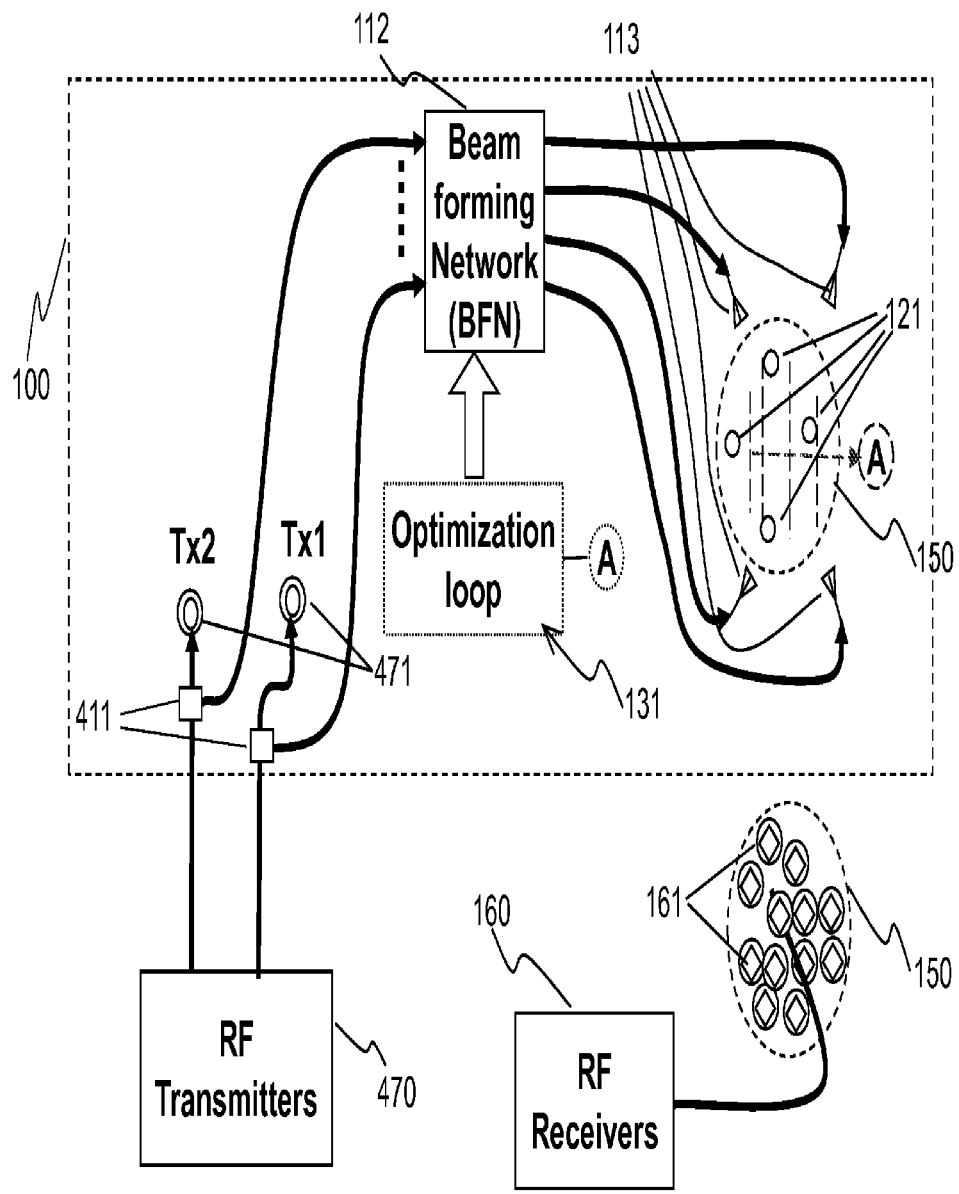
FIG. 4 illustrates a block diagram of a second architecture and method of generating quiet zone via injection of self-interference for cancellation over receiving apertures in a RF system according to an embodiment of the present invention. An auxiliary Tx array, a diagnostic network, and an optimization loop are depicted accordingly. The weight updating is electronic amplitude and phase weighting, or equivalent.

FIG. 4 depicts another implementation method for the functional blocks of the injection for cancellation techniques 100 against self-jamming in FIG. 1. There is one major difference:
1. An implementation of pickup array 111 as two pickup probes 411 at the outputs of the RF transmitters 470 before two Tx apertures 471, Tx1 and Tx2, i.e. at the inputs of the two Tx apertures 471. The beam forming network (BFN) is coupled to multiple nodes at respective inputs of the two Tx apertures 471. The interference signal injectors 113, i.e., injection elements, are distributed around the targeted quite zone 150; two of the injection elements 113 are distributed opposite to each other with respect to the targeted quite zone 150 and another two of the injection elements 113 are also distributed opposite to each other with respect to the targeted quite zone 150.

Figure 5:
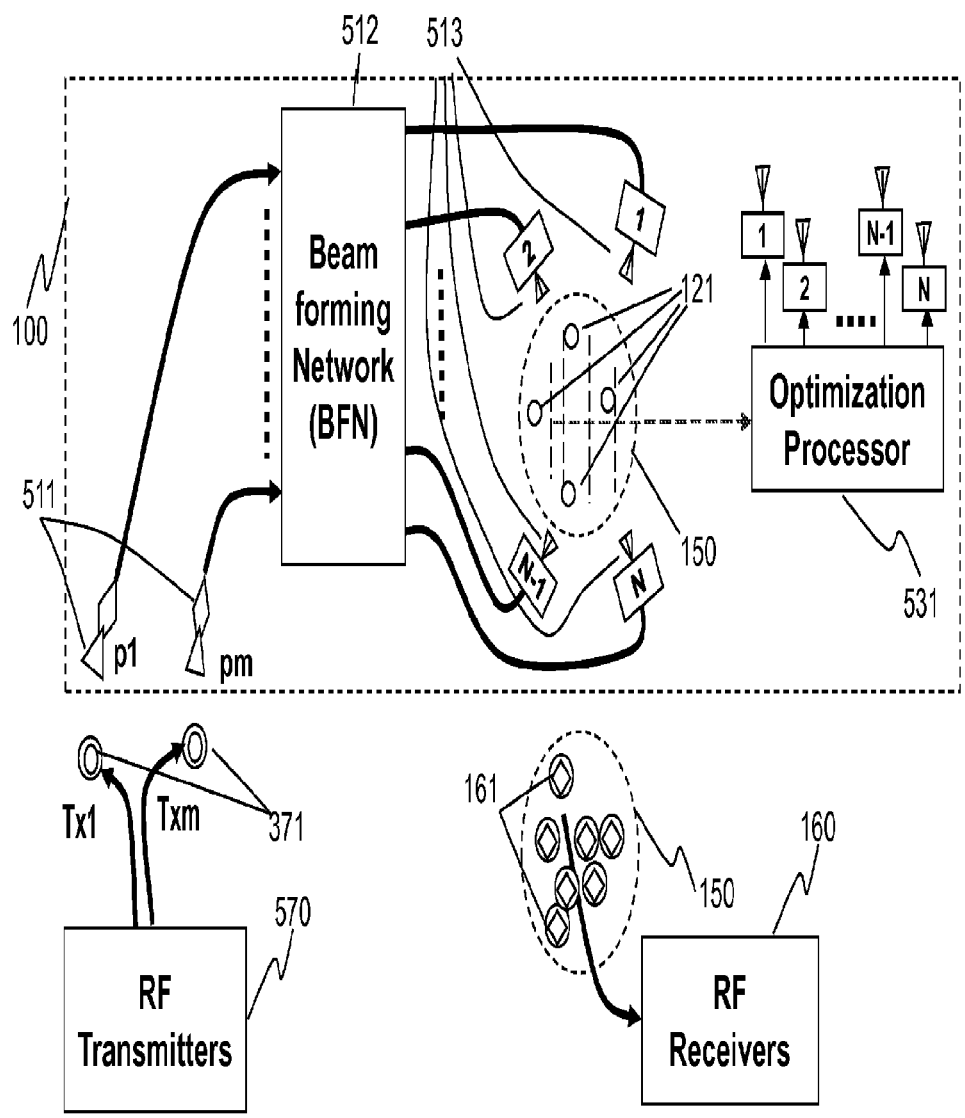
FIG. 5 illustrates a block diagram of a second architecture and method of generating quiet zone via injection of self-interference for cancellation over receiving apertures in a RF system according to an embodiment of the present invention. An auxiliary Tx array, a diagnostic network, and an optimization loop are depicted accordingly. The weight updating is via element repositioning.

FIG. 5 depicts another implementation method for the functional blocks of the injection for cancellation techniques 100 against self-jamming in FIG. 1. There are two major differences:
1. Optimizations are via element repositioning of the injection radiation array elements 513 with only
   a. BNFs 512 with fixed BWVs
   b. optimization processor 531 controlling the repositioning mechanisms 513
2. An implementation of pickup array 111 as two pickup probes 511 at the outputs of the RF transmitters 570 before two Tx apertures 471, Tx1 and Tx2. The injection radiation array elements 513, i.e., injection elements, are distributed around the targeted quite zone 150; two of the injection elements 513 are distributed opposite to each other with respect to the targeted quite zone 150 and another two of the injection elements 513 are also distributed opposite to each other with respect to the targeted quite zone 150.

Figure 6:
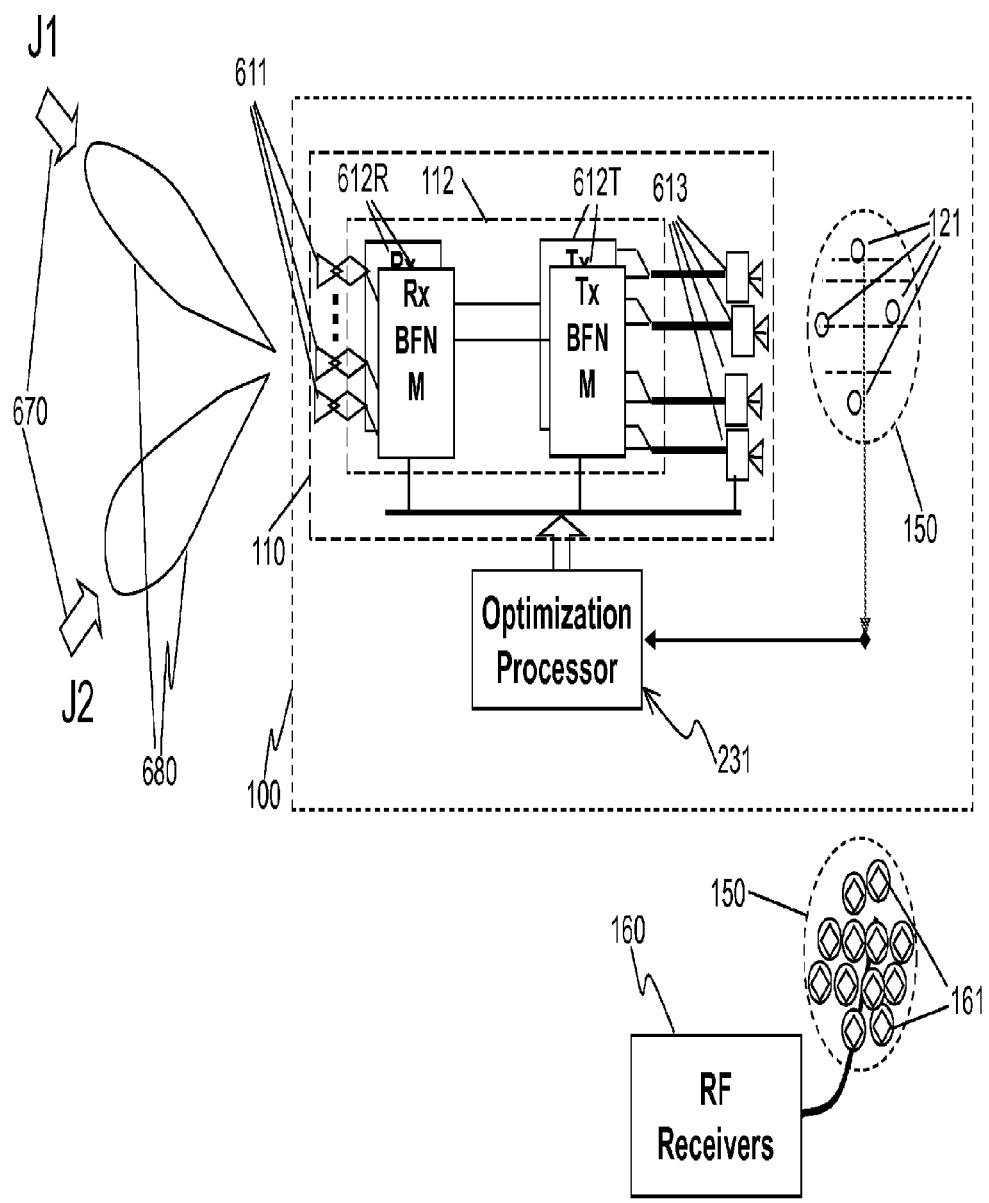
FIG. 6 illustrates a block diagram of an architecture and method of generating quiet zone via injection of external interference for cancellation over receiving apertures in a RF system according to an embodiment of the present invention. An auxiliary Tx array, a diagnostic network, and an optimization loop are depicted accordingly. The weight updating is electronic amplitude and phase weighting, or equivalent, and via element re-positioning.

FIG. 6 depicts an implementation method for the functional blocks of the injection for cancellation techniques 100 against external jamming in FIG. 2. There are five major differences;
1. Pickup array 611 with M-elements used for multiple jamming beams 680 tracking multiple (Jm) power jammers 670, respectively,
2. Each pickup beam is formed by a M-to-1 Rx BFN 612R, and the M Rx BFN 612R are arranged in parallel. One of the Rx BFN 612R arranged in parallel has a port coupled to an element in the pickup array 611 and to a port of another one of the Rx BFN 612R.
3. Each pickup beam is also associated with a 1-to-N Tx BFN 612T, and multiple 1-to-N Tx BFN 612T are arranged in parallel. One of the 1-to-N Tx BFN 612T may have a port coupled to a port of one of the Rx BFN 612R and another port coupled to a port of another one of the 1-to-N Tx BFN 612T and to one of the N injection radiation elements 613.
4. There are N injection radiation elements 613,
5. Optimizations are via multiple loops where:
   a. Rx BFNs 612R are optimized by altering BWVs for best reception of individual jammers, or equivalent,
   b. Tx BFNs 612T are optimized by altering CWVs and Tx radiation element repositioning, with the aim of altering field distributions of jamming signals in quiet zones.

Figure 7:
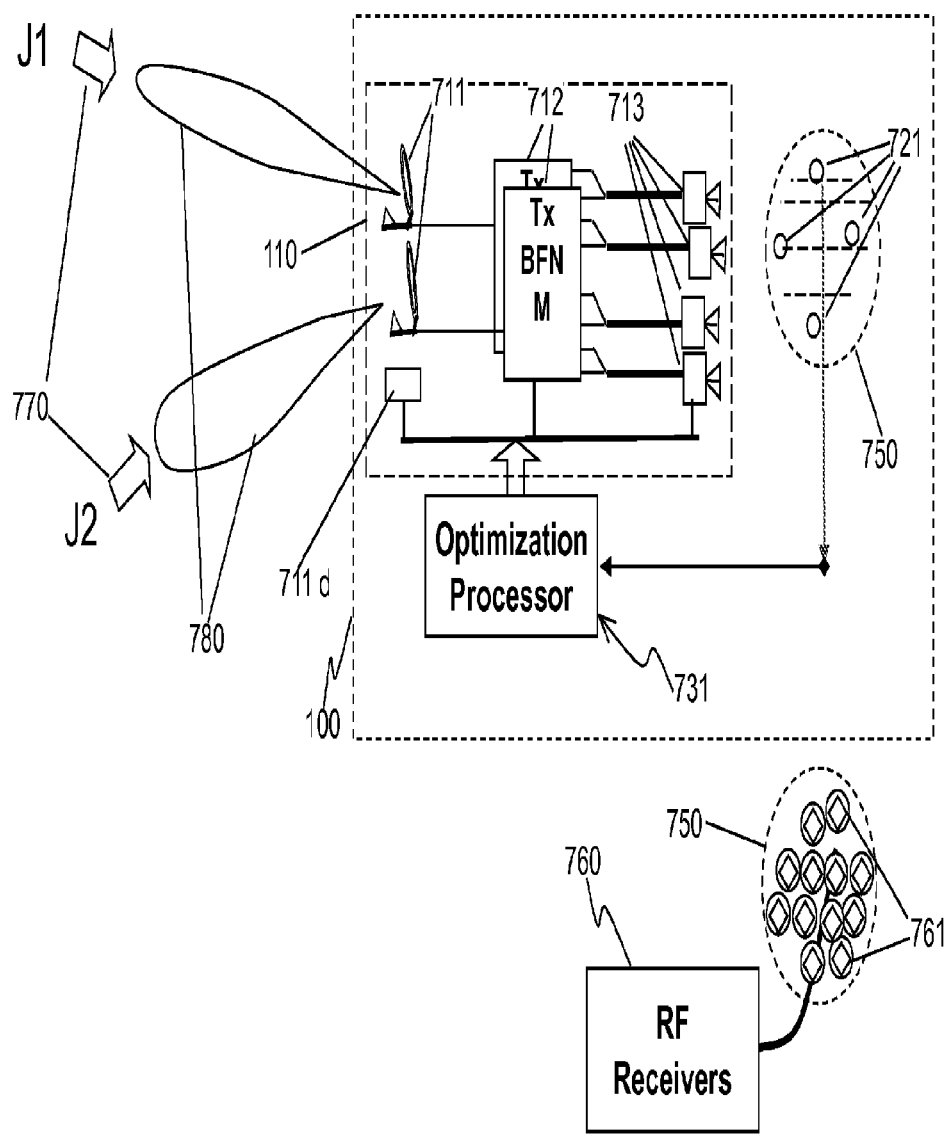
FIG. 7 illustrates a block diagram of an architecture and method of generating quiet zone via injection of external interference for cancellation over receiving apertures in a RF system according to an embodiment of the present invention. An auxiliary Tx array, a diagnostic network, and an optimization loop are depicted accordingly. The inputs to the auxiliary array are from directional high gain antennas pointed to interference directions. The weights updating for the interference injections are electronic amplitude and phase weighting, or equivalent, and via element re-positioning.

FIG. 7 depicts another implementation method for the functional blocks of the injection for cancellation techniques 100 against external jamming in FIG. 2. There are five major differences:
1. High gain antennas 711 used for generating multiple (Jm) pick-up beams 780 tracking multiple (Jm) power jammers 770, respectively,
2. Each high gain antenna capable of forming multiple beams over a limited field-of-view (FOV) are driven by directional drivers 711-d controlled by the optimization processor 731,
3. Each pickup beam is associated with a 1-to-N Tx BFN 712,
   a. Total M Tx BFNs, or equivalent, 4. There are N injection radiation elements 713, and
5. Optimizations are via multiple loops:
   a. Rx beams 760, or pickup beams, are optimized by repositioning the high gain antennas 711 and their feeds, or equivalent, for best reception of individual jammers,
   b. by altering CWVs of Tx BFNs 712 and repositioning Tx radiation elements 713
   c. iteratively modifying field distributions of jamming signals in quiet zones 750 monitored continuously by diagnostic probes 721;
   d. all Rx apertures 761 are "covered" by the quiet zones 750

Figure 8:
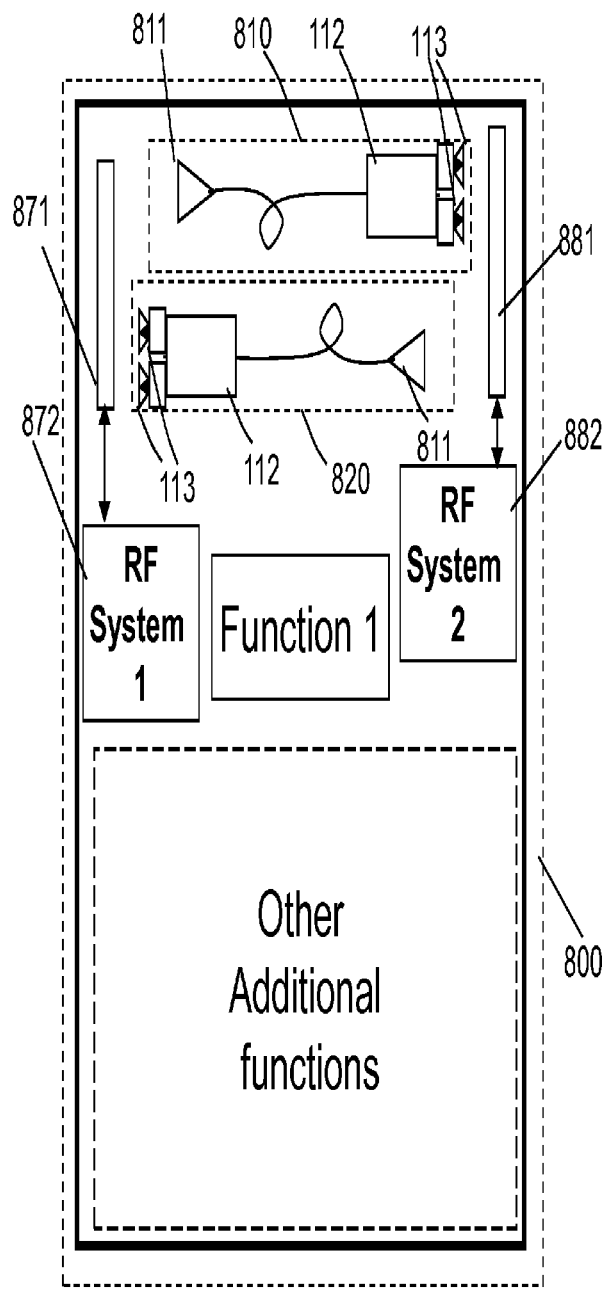
FIG. 8 illustrates a block diagram of architecture and method of generating quiet zones in a handheld device with multiple RF functions via injection of self-interference for cancellation over receiving apertures in RF systems according to an embodiment of the present invention. An auxiliary Tx array, a diagnostic network, and an optimization loop are depicted accordingly. The weight updating is electronic amplitude and phase weighting, or equivalent, and via element re-positioning.

FIG. 8 depicts an implementation method for the functional blocks of the injection for cancellation techniques against self jamming in a handheld device 800. The handheld device features multiple independent RF functions 871+872, and 881+882. The injection arrays 810, 820, each with a feed back loop, are to minimize undesired self jamming signals iteratively by dynamically updating the amplitudes and phases weightings, or equivalents, of individual elements in the injection arrays.

There are potential RF leakages from RF System 1 872 transmission to a sensitive receiver of RF System 2 882 operating in same frequency channels. The leakages may be from a transmit antenna 871 of the RF System 1 872 via multiple propagation paths inside the handheld device to the receive antenna 881 or other parts of RF system 2 882 electromagnetically.

The injection for cancellation circuits 810 iteratively alter the field distribution of injected interference signals making quiet zones over the small areas where RF system 2 881+882 are anchored. The weightings of all elements in an injection array 810 are the components of a "cancel beam weighting vector" or a CWV. The inputs to the injection arrays are from a pick up antenna 811 adjacent to RF system 1 antenna 871 which only pickups jamming RF 1 transmission signals. The feed back loop (not shown) to the injection arrays features a few diagnostic probes (not shown) over quiet zones for the RF 2 Rx aperture 881, and will be used to measure the strengths of combined interference signals. An optimization processor (not shown) in the feed back loop converts the measurements from each probes into performance indexes; which are cost functions and must be positively definite.

The summation of the cost functions is referred as the total cost of the current performance measure for the injection arrays. The to-be-updated CWVs of the next iteration for individual elements of the injection arrays are calculated based on the cost gradient by optimization algorithms minimizing the total cost iteratively.

After the iterative results converge, the resulting cost at an optimized state will be reduced significantly. Consequently, the internal strong leakage signals are minimized, creating quiet zone 881+882 within which the sensitive Rx aperture 881 of the RF System 2 882 and itself 882 are resided. Therefore RF system 2 will be well protected from "Rx front-ends saturations" by the self-interferences.

There are potential RF leakages from RF System 2 882 transmission to a sensitive receiver of RF System 1 872 operating in same frequency channels. The leakages may be from a transmit antenna 881 of the RF System 1 882 via multiple propagation paths inside the handheld device to the receive antenna 871 or other parts of RF system 1 872 electromagnetically.

The injection for cancellation circuits 820 are to make quiet zones over the small areas where RF system 1 870 is anchored.

What is claimed is:

1. A communication terminal for generating injection to a target zone, comprising:
   an injection element configured to radiate a first signal to said target zone;
   a transmission (Tx) beam forming network arranged upstream of said injection element;
   a reception (Rx) beam forming network arranged upstream of said transmission (Tx) beam forming network;
   an optimization processor configured to update a first weight vector for said reception (Rx) beam forming network and a second weight vector for said transmission (Tx) beam forming network.

2. The communication terminal of claim 1 further comprising a pickup element arranged upstream of said reception (Rx) beam forming network, wherein said pickup element is configured to pick up a second signal from a signal source.

3. The communication terminal of claim 1 further comprising a diagnostic probe configured to measure a combined field, of a second signal from a signal source and said first signal, over said target zone into a measurement to be routed to said optimization processor.

4. The communication terminal of claim 1, wherein said optimization processor is further configured to update a position of said injection element.

5. The communication terminal of claim 1 further comprising multiple pickup elements arranged upstream of said reception (Rx) beam forming network, wherein said pickup elements are configured to pick up multiple second signals from multiple signal sources via their proximity to said signal sources.

6. The communication terminal of claim 1 further comprising multiple pickup elements arranged upstream of said reception (Rx) beam forming network, wherein said pickup elements are configured to pick up multiple second signals from multiple signal sources in a far field.

7. The communication terminal of claim 1 further comprising multiple pickup elements arranged upstream of said reception (Rx) beam forming network, wherein said pickup elements are configured to pick up multiple second signals from multiple signal sources via their directional discrimination capabilities.

8. The communication terminal of claim 1 configured to be mobile.

9. A system of generating injection for mitigating interference over a target zone, comprising:
   multiple injection elements configured to radiate a signal to said target zone, wherein said injection elements are distributed around said target zone, wherein two of said injection elements are distributed opposite to each other with respect to said target zone;
   a beam forming network arranged upstream of said injection elements, wherein said beam forming network is configured to perform a weighting vector for an input of said beam forming network; and
   a diagnostic network configured to measure a combined field of said interference and said signal, and update said weighting vector based on said combined field.

10. The system of claim 9 further comprising a pickup element arranged upstream of said beam forming network, wherein said pickup element is configured to pick up said interference.

11. The system of claim 9, wherein said beam forming network comprises an input routed to a node at an input of a transmission (Tx) antenna.

12. The system of claim 9, wherein said diagnostic network is further configured to generate a total cost based on a sum of multiple cost functions related to said combined field, measure a gradient of said total cost with respect to said weighting vector and update said weighting vector based on said gradient.

13. The system of claim 9, wherein said weighting vector comprises multiple amplitude weightings.

14. The system of claim 9, wherein said beam forming network comprises a first input routed to a first node at an input of a first transmission (Tx) antenna and a second input routed to a second node at an input of a second transmission (Tx) antenna.

15. A system of generating injection for mitigating interference over a target zone, comprising:
- an injection element configured to radiate a signal to said target zone;
- a beam forming network arranged upstream of said injection element, wherein said beam forming network is configured to perform a weighting vector for an input of said beam forming network; and
- a diagnostic network configured to measure a combined field of said interference and said signal over said target zone, generate a total cost based on a sum of multiple cost functions related to said combined field, measure a gradient of said total cost with respect to said weighting vector and update said weighting vector based on said gradient.

16. The system of claim 15 further comprising a pickup element arranged upstream of said beam forming network, wherein said pickup element is configured to pick up said interference.

17. The system of claim 15, wherein said weighting vector comprises multiple amplitude weightings.

18. The system of claim 9, wherein another two of said injection elements are distributed opposite to each other with respect to said target zone.

19. The system of claim 9, wherein said weighting vector comprises multiple phase weightings.

20. The system of claim 15, wherein said weighting vector comprises multiple phase weightings.

21. The system of claim 15 further comprising multiple pickup elements arranged upstream of said beam forming network, wherein said pickup elements are configured to pick up said interference from multiple signal sources via their proximity to said signal sources.

22. The system of claim 15 further comprising multiple pickup elements arranged upstream of said beam forming network, wherein said pickup elements are configured to pick up said interference from multiple signal sources via their directional discrimination capabilities.

* * * * *